United States Patent [19]

Kurtin et al.

[11] Patent Number: 5,268,767
[45] Date of Patent: Dec. 7, 1993

[54] IMAGE PATTERN FOR FACSIMILE RECEIVER WITH RECIPROCATING PRINTHEAD AND METHOD

[76] Inventors: Stephen Kurtin, 3835 Kingswood Rd.; Saul Epstein, 14558 Deervale Pl., both of Sherman Oaks, Calif. 91403

[21] Appl. No.: 938,625

[22] Filed: Sep. 1, 1992

Related U.S. Application Data

[63] Continuation-in-part of Ser. No. 918,567, Jul. 22, 1992.

[51] Int. Cl.$^5$ .............. H04N 1/032; B41J 2/145
[52] U.S. Cl. ..................... 358/296; 346/140 R
[58] Field of Search ............... 358/296; 346/140 R, 346/75; 400/126

[56] References Cited

U.S. PATENT DOCUMENTS 4,972,270  11/1990  Kurtin et al. .................. 358/296

Primary Examiner—Edward L. Coles, Sr.
Assistant Examiner—Scott A. Rogers
Attorney, Agent, or Firm—Saul Epstein

[57] ABSTRACT

A plain paper facsimile receiver using a reciprocating shuttle, and, preferably, an ink jet printhead having one or more columns of ink jet nozzles. The printhead is mounted on the shuttle carriage at an angle so as to result in a line density of twice the line density specified in the facsimile standard used. In a first embodiment, the control circuitry is arranged so that dots formed by any nozzle can be formed only in alternate dot columns of the printed image, and dots formed by adjacent nozzles cannot be formed in the same dot column. In a second embodiment, a denser image is formed by printing an even number of dots in each pel corresponding to a picture element of the original facsimile image.

24 Claims, 2 Drawing Sheets

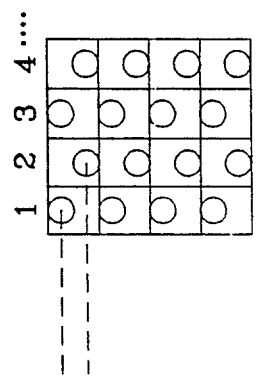
FIG. 3
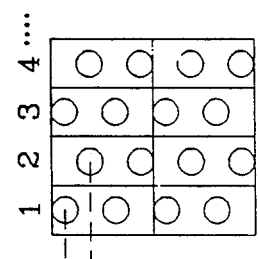
FIG. 4
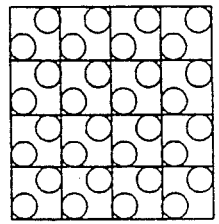
FIG. 5
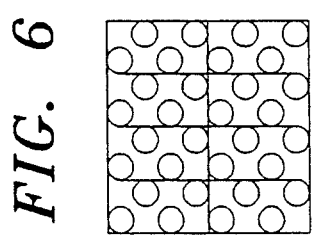
FIG. 6
FIG. 7
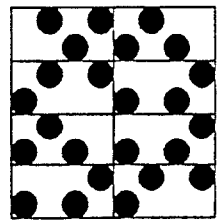
FIG. 8

IMAGE PATTERN FOR FACSIMILE RECEIVER WITH RECIPROCATING PRINTHEAD AND METHOD

RELATED APPLICATION

This application is a Continuation-in-Part of application Ser. No. 918,567 filed Jul. 22, 1992.

BACKGROUND OF THE INVENTION

In recent years, facsimile (generally called fax) machines have become very popular for transmitting graphic information from one place to another, particularly over the public switched telephone network. A fax transmission can be made as simply as a telephone call, using a fax machine at each end of the line instead of a telephone instrument. Within each fax machine are means for producing electrical signals representative of an image to be transmitted, and for coupling these signals to a telephone system. Also within each machine is a receiver for receiving fax signals and for reconstructing an original image in printed form.

In order to facilitate fax communications between large numbers of users, an international organization, The International Telephone and Telegraph Consultative Committee (CCITT), has defined certain standards (called Recommendations) to be utilized by users of fax to communicate with other users. These standards are intended to permit communication between machines made by different manufacturers possibly located in different countries. The CCITT has adopted compatibility standards covering the transmission and reception of fax signals according to four speed/quality groups: Groups 1, 2, 3, and 4. The vast majority of fax signals today are sent and received according to the Group 3 compatibility standard (CCITT Recommendation T.4). Groups 1 and 2 are relatively slow earlier standards, while Group 4 requires a special high quality telephone line and has not yet gained popularity. The present invention is therefore described in connection with the Group 3 standard. It should be understood, however, that its applicability is not necessarily limited to Group 3 communications.

Fax transmission starts by scanning an original page in raster fashion. The variations of print density on the page are converted into a digital video signal which is subsequently coded for efficient transmission. This coded signal is modulated on an audio carrier and sent over a telephone network. At a remote terminal the signal is received, demodulated, decoded and used to cause a printing device to print an image corresponding to the original.

There are two modes of transmission defined by the CCITT Group 3 standard, standard and fine. The fine mode raster has a resolution of 7.7 lines per mm (about 196 lines per inch) vertically, with each line including 1,728 picture elements ("pels") along a standard 215 mm scan line, i.e. 204 pels per inch horizontally. Each fine mode pel therefore represents a small rectangular area about 5 mils square (1 mil=0.001 inch). The standard mode raster has half the vertical resolution of the fine mode (3.85 lines per mm), but the same horizontal resolution (i.e., 98 V×204 H picture elements per inch). A standard mode pel is thus about 10 mils high by about 5 mils wide. According to the CCITT Recommendation T.4, the nominal pel sizes as defined should be maintained within plus or minus one percent.

The printing mechanism of most prior art fax receivers uses a thermal printhead which is essentially a linear array of resistors, each of which produces heat in response to received electrical signals. By passing thermally sensitive paper over the printhead while received signals are causing the print elements of the printhead to be heated, dark spots corresponding to the dark picture elements of the original copy are formed. The totality of the dark spots formed during the transmission of a fax image is intended to be a copy of the original image.

An important disadvantage of the system as described above is the necessity to use special thermally sensitive paper on which the received image is formed. Not only is thermally sensitive paper expensive, but its handling and surface characteristics are such that most people find it to be undesirable. It is therefore an object of the present invention to provide a fax machine which will receive CCITT standard fax signals, but will print an image on plain paper rather than on thermally sensitive paper as used in the prior art.

Not all fax machines are of the thermal type; there are some which print on plain paper. Most of these utilize a relatively expensive laser printing engine, but some utilize an ink jet type of printhead. The ink jet type plain paper fax machines presently on the market, while less expensive than laser printer types, print more slowly than the incoming data stream, and are therefore not desirable.

In a previously issued patent, U.S. Pat. No. 4,972,270, the present inventors disclosed methods for forming fax images on plain paper using an ink jet printing cartridge which, when mounted square with respect to he scanning direction, is intended to print images with a line density of 300 lines per inch. Two methods were disclosed, one where the printhead was slanted to achieve the 98 and 196 lines per inch line densities used in Group 3 fax transmissions, and the other which approximated Group 3 line densities (actually providing 100 and 200 lines per inch) by printing dots in a certain pattern using a squarely mounted printhead.

At the time the application for the aforementioned patent was filed, only one ink jet printhead cartridge was available on the market. This printhead cartridge was manufactured by the Hewlett-Packard Company for its DeskJet series of printers and had a basic 300 lines per inch line density (i.e., the line density when the nozzle column is perpendicular to the direction of scanning). Since that time two other ink jet cartridges have appeared, but neither is intended to print with a line density in accordance with CCITT fax standards.

It is an object of the present invention to create facsimile images consistent with CCITT recommendations (in particular Recommendation T.4 for Group 3 facsimile) using ink jet cartridges which have nozzle spacings other than equal to the line spacings specified in the CCITT facsimile recommendations.

It is a further object of the present invention to utilize an ink jet type of printhead in a plain paper fax machine which prints faster than ink jet type fax machines which are presently on the market.

SUMMARY OF THE INVENTION

The present invention is intended to permit images conforming to CCITT facsimile recommendations to be created using printheads which have a plurality of dot-forming elements arranged in columnar fashion, where the spacing between the dot-forming elements is not equal to the line spacing set out in the applicable CCITT recommendation. In the presently preferred embodiment of the present invention, ink jet cartridges are used which have dot-forming elements, i.e., ink jet nozzles, spaced such that the line spacings which would be obtained if the printhead were scanned in a direction perpendicular to the nozzle columns, would be less than the desired facsimile line spacings. That is, that the basic cartridge line densities are greater than 196 lines per inch (the Group 3 fine mode line density). Insofar as is known, there are currently three commercially available cartridges which meet this description, the Canon Bubble Jet cartridge which has 64 nozzles and a basic line density of 360 lines per inch, the Mannesmann ink jet cartridge which has 50 nozzles and a basic line density of 300 lines per inch, and the Hewlett-Packard DeskJet cartridge which has 50 nozzles and a basic line density of 300 lines per inch.

According to one presently preferred embodiment of the invention, the printhead cartridge is mounted at an angle to the scanning direction of the carriage such that the printing line density is twice the line density standard specified for Group 3 facsimile, i.e., about 392 lines per inch. The lines (rows of printed dots) are thus spaced about 0.00255 inches apart. The control system is arranged such that each dot-forming element is permitted to print only in alternate columns of pel spaces, with adjacent dot-forming elements not being permitted to print in the same columns. The resulting image has one dot location per pel space in fine mode, and two dot locations per pel space in standard mode. A dot location, as the term is used herein, refers to a location on the surface being printed which may or may not include a printed dot, depending on the optical density of the corresponding area of the original image.

Depending on the size of dots printed by the particular printhead used, the dots, as printed, may fill between about 30% and 80% of the pel areas. It may be found that if a printhead which prints small dots is sued, the image may be grayer than desired. In such case it may be found desirable to use a modified dot pattern which provides two dot locations in each fine mode pel space, and four dot locations in each standard mode pel space.

BRIEF DESCRIPTION OF THE DRAWINGS

FIG. 3 is a diagrammatic view of the nozzles of a printhead used in connection with the present invention, looking down on the nozzles from within the printhead.

FIG. 4 is a top view of a small area of a sheet of paper on which a fax image may be formed, showing the dot locations for eight contiguous standard mode pels. FIG. 4 is aligned with FIG. 3 to indicate which nozzles are used to print dots in the various pels.

FIG. 5 is similar to FIG. 4 except that sixteen fine mode pels are shown. FIG. 5 is also aligned with FIG. 3 to indicate which nozzles are used to print dots in the various pels.

FIG. 6 is a view similar to that of FIG. 4, but of an image formed in accordance with a second embodiment of the invention.

FIG. 7 is a view similar to that of FIG. 5, but of an image formed in accordance with a second embodiment of the invention.

FIG. 8 illustrates the pattern as shown in FIG. 6, but with fewer than all of the available dot locations being printed.

DETAILED DESCRIPTION OF THE INVENTION

Figure 1:
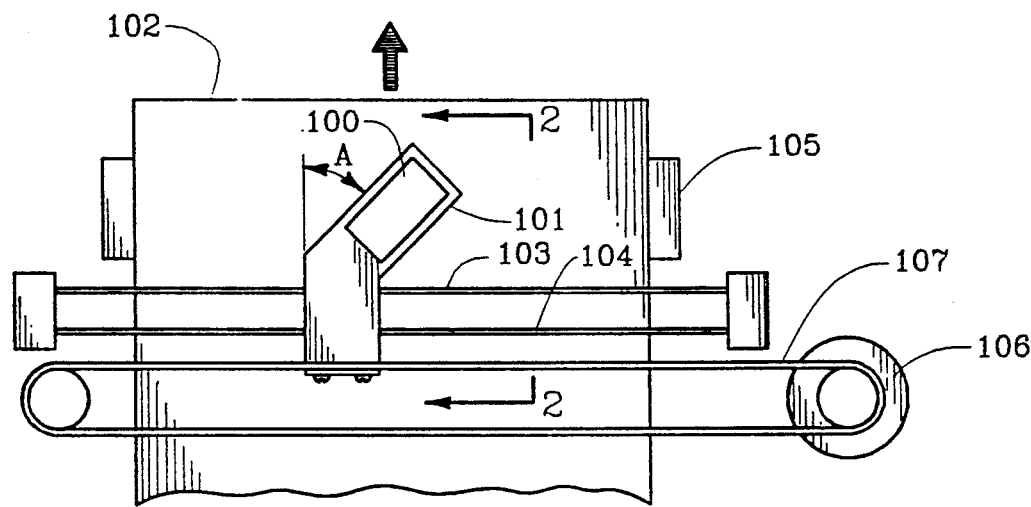
FIG. 1 is a schematic plan view of the mechanical components of the presently preferred embodiment of the invention.
Figure 2:
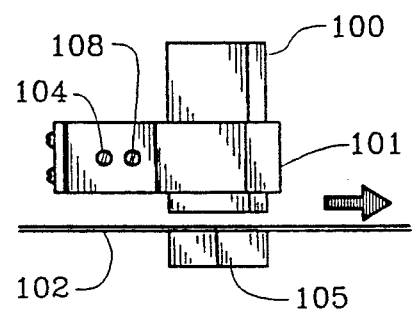
FIG. 2 is a partial cross section taken at 2—2 of FIG. 1.

Reference is first made to FIG. 1, which schematically depicts the mechanical structure of a fax receiver according to the present invention. A printhead 100 is shown mounted on a carriage 101, the assembly being constrained to move reciprocally across a sheet of paper 102 by guide rods 103 and 104. To simplify the explanatory language used in this specification and the claims, the direction of printhead motion is called horizontal, and the orthogonal direction along the paper is called vertical. The paper sheet 102 is supported a small fixed distance away from the bottom surface of the printhead 100 by platen 105. As will be described below, the bottom surface of the printhead contains a number of nozzles through which droplets of ink are ejected. These droplets form dots on the paper sheet 102 as they are ejected. Motor 106 and belt 107, under control of a scanning control system, not shown, cause the printhead to scan back and forth across the sheet. After each scan, a sheet advance mechanism, not shown, advances the sheet in a direction perpendicular to the printhead motion.

The design of the printhead 100 forms no part of this invention. As noted in the Summary of the Invention section of this application, three suitable commercially produced printhead cartridges are known to be available. Within the printhead is a relatively large ink reservoir and a number of ink ejectors which cause droplets of ink to be ejected. On the bottom surface of the printhead (the surface which faces the sheet of paper 102) are ink nozzles 120-1 through 120-n. These nozzles are the passages through which the ink droplets are ejected. By firing the appropriate ejector, a droplet can be ejected from any nozzle at any time, subject, of course, to the maximum firing rate of the ejectors. By selectively ejecting droplets as the printhead scans across the sheet, any desired pattern of dots can be printed on the sheet.

The printhead 100 is set at an angle (A) with respect to the scanning direction of the printhead carriage. The angle A depends on the basic line density of the cartridge used. The term "basic line density" refers to the line density achieved when the column(s) of dot-forming elements is orthogonal to the direction of printhead scanning. The objective to be attained by setting the printhead at an angle is to reduce the vertical distance between adjacent rows of dots formed by the nozzles to one half of the fine mode line spacing of the fax image (i.e., in the case of Group 3 machines, to 0.00255 inches, which corresponds to a 392 lines per inch print raster). In the case of a basic 360 lines per inch printhead, angle A should be about 67 degrees. A basic 300 line per inch printhead should be tilted about 50.1 degrees. If a multi-columned printhead is used, the rows of dots formed by the dot-forming elements in the various columns should fall between the rows formed by the dot-forming elements of the other columns so that a raster of equally spaced rows is formed.

FIG. 3 is a diagrammatic view looking down through the printhead 100 showing the spatial relationship between the nozzles 120 when the printhead is angularly mounted. FIG. 4 is a top view of a portion of a paper sheet 102 and is aligned with FIG. 3 so as to illustrate which nozzles form which rows of dots. FIG. 4 shows the outlines of eight standard mode pels with the dot locations within each pel indicated by "o". As can be seen, there are two dot locations within each pel. It should be noted that for reasons of clarity, the dot indications in FIG. 4 ("o") have purposely been shown smaller than dots are normally printed. Dots printed by presently available printheads are about 0.003 to 0.005 inches in diameter, and therefore nearly abut.

For explanatory purposes, the columns of dot locations shown in FIG. 4 are numbered from the left as columns 1, 2, 3, etc. Inspection of the dot pattern depicted in FIG. 4 shows that dots printed in odd numbered columns are printed with odd numbered nozzles (120-1, 120-3, etc.) whereas dots printed in even numbered columns are printed by even numbered nozzles, (120-2, 120-4, etc.). According to this pattern, no nozzle is required to print dots in two adjacent pels; that is, dots along the rows are spaced at least two pel widths.

There are two advantages to having the dot locations at which any single ejector may be required to fire be spaced a minimum distance of two pel widths. Firstly, since the firing rate of the ejectors is limited, the scanning rate of the printhead can be increased substantially. Faster scanning permits faster printing of the fax images. Secondly, less ink is consumed.

In standard mode, each pel on the printed image contains two dot locations. For example, the top left hand pel illustrated in FIG. 4, if printed, would contain a dot printed by nozzle 120-1 and a dot printed by nozzle 120-3. The next pel to the right would contain dots printed by nozzles 120-2 and 120-4, etc. In each case, either both dot locations within a pel are printed, or neither is, depending on the optical density of the corresponding picture element in the original image. In fine mode, only one dot location per pel is used. This is illustrated in FIG. 5 where it can be seen that the top left pel contains only a dot printed by nozzle 120-1 and the next pel to the right contains only a dot printed by nozzle 120-2.

Figure 9:
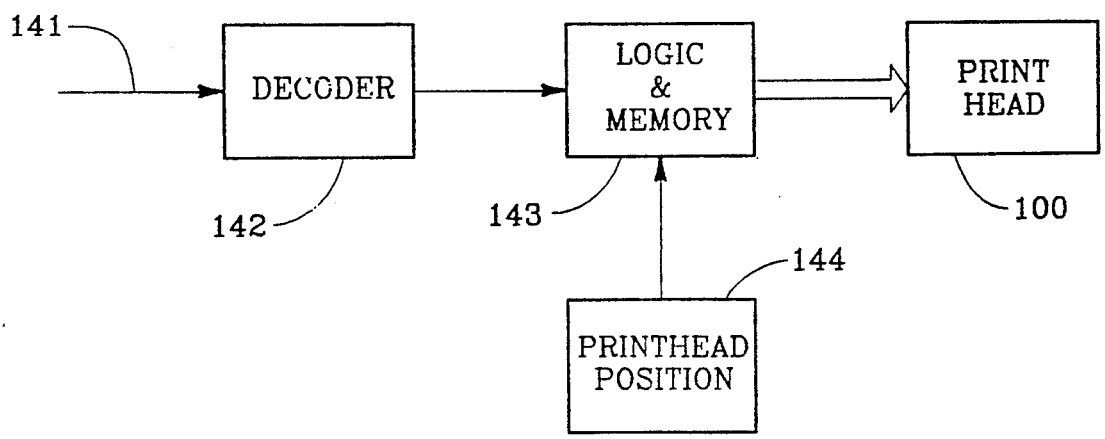
FIG. 9 is a simplified block diagram of an electronic circuit which may be used in connection with the present invention.

FIG. 9 is a simplified block diagram of an electronic circuit which can be used to create a fax image in accordance with the present invention. A coded digital signal corresponding to an image being transmitted by a remote fax machine is received on line 141 and fed to decoder 142 and thence to logic/memory unit 143. The logic/memory unit 143 converts the serial signal received from decoder 142 into a parallel format and, under control of printhead position encoder 144 (which might, for example, be built into motor 106), drives the ejectors in printhead 100. The ejectors are fired with such timing and in such sequence as to form a pattern of dots corresponding to the image scanned by the transmitting fax machine. The logic necessary to accomplish the required functions may be implemented in a straightforward manner and is well understood by persons skilled in the art. A detailed explanation is therefore deemed unnecessary.

As will be realized, spreading out the dots printed by a printhead intended to print at 300 V×300 H or more DPI (90,000 or more dots/sq in) such that the image is printed on about a 196 V×204 H DPI grid (about 40,000 dots/sq in) results in an image which is not as dark as was intended by the printhead manufacturer. That is, the image may be somewhat gray, and not a dense black. In some cases the image may even appear grayer than desired. In such cases, a different dot pattern may be used which will increase the image density to about 80,000 dots/sq in (to about 392 V×204 H). The printhead is tilted as described for the first embodiment of the invention so that the line density is about 392 lines per inch, but the pattern is altered to provide more printed dots in a given area. This dot pattern is illustrated in FIGS. 6 and 7 for standard and fine mode images respectively. It can be seen in FIG. 6 that each pel includes four dot locations. All or none are preferably printed depending on the optical density of the corresponding pel of the original image. As shown in FIGS. 6 and 7, the dot locations in each alternate row of dot locations is offset horizontally so that the alternate dots are not aligned vertically. This preferred pattern provides the largest possible ink area in the printed regions. It was previously noted that the rows of dot locations are about 0.00255 inches apart, and that currently available printheads print dots about 0.003 to 0.005 in diameter. Hence, if the rows of dots are vertically aligned, the dots will somewhat overlap. Offsetting the alternate rows of dots avoids the overlap, and provides a larger inked area where dots are printed.

In fine mode (FIG. 7) each pel includes two dot locations, both or none of which are printed, again depending on the optical density of the corresponding pel of the original image. A similar trade-off between ink consumption and image blackness is also possible in this configuration.

If the dot size of the printed dots is large enough so that an adequately black image can be attained with less than all of the available dot locations being printed, e.g., with only three of the four dot locations in standard mode being printed, the pattern may be printed with one or more of the dot locations in the pel areas left blank while the others are printed. It is preferred, however, that if such is done, the unprinted dot locations in the pel areas be randomly selected. Randomly selecting the omitted dots, will reduce the tendency for a visible line across the page to appear. FIG. 8 illustrates a printed area which includes eight contiguous standard mode pel spaces wherein only three of the four dot locations in each pel space are printed, with the omitted dot locations being randomly selected.

Permitting dots to be printed in less than all of the available dot locations saves ink, and hence there is a trade-off which may be made between the blackness of the image and the amount of ink consumed during the printing operation.

We claim:
1. A facsimile receiver which comprises:
   means for receiving electrical signals representative of an image to be printed;
   means for converting said electrical signals into signals for driving dot-forming elements of a printhead;
   a printhead having a plurality of dot-forming elements arranged in one or more parallel columns;
   mounting means for mounting said printhead for reciprocal motion across a sheet of paper, said printhead being mounted whereby said column or columns make an acute angle with respect to the direction of said reciprocal motion, and said dot-forming elements are equally spaced in the direction perpendicular to said reciprocal motion;
   means for causing said printhead to move across said sheet with reciprocal motion; and control means for coupling said converted electrical signals to said dot-forming elements whereby rows of dots corresponding to the image to be printed will be formed on said sheet at dot locations within an imaginary array of rows and columns of pel areas on said sheet, each pel area corresponding to the location of a picture element on the image to be printed and including at least one dot location, each of said dot-forming elements forming dots only in alternate pel areas.

2. A facsimile receiver as recited in claim 1 wherein no two adjacent rows of dots include a dot in the same column of pel areas.

3. A facsimile receiver as recited in claim 1 wherein each pel area contains two dot locations, dots being printed at both or neither dot location within each pel area depending on the optical density of the corresponding picture element of the original image.

4. A facsimile receiver as recited in claim 3 wherein no two adjacent rows of dots include a dot in the same column of pel areas.

5. A facsimile receiver which comprises:
means for receiving electrical signals representative of an image to be printed;
means for converting said electrical signals into signals for driving dot-forming elements of a printhead;
a printhead having a plurality of dot-forming elements arranged in one or more parallel columns;
mounting means for mounting said printhead for reciprocal motion across a sheet of paper, said printhead being mounted whereby said dot-forming elements form dots in equally spaced rows as said printhead is moved across said sheet of paper;
means for causing said printhead to move across said sheet of paper with reciprocal motion; and
control means for coupling said converted electrical signals to said dot-forming elements, said signals being coupled whereby dots are formed on said sheet of paper arrayed in rows and columns, each dot-forming element being constrained to form dots only in alternate columns.

6. A facsimile receiver as recited in claim 5 wherein no two dot forming elements which print adjacent rows of dots print dots in the same columns.

7. A facsimile receiver as recited in claim 5 wherein said dot-forming elements are divided into groups of two, the dots printed by both dot-forming elements in each group of two being printed in the same columns.

8. A facsimile receiver as recited in claim 7 wherein no two dot forming elements which print adjacent rows of dots print dots in the same columns.

9. A facsimile receiver which comprises:
means for receiving electrical signals representative of an image to be printed;
means for converting said electrical signals into signals for driving dot-forming elements of a printhead;
a printhead having a plurality of dot-forming elements arranged in one or more parallel columns;
mounting means for mounting said printhead for reciprocal motion across a sheet of paper, said printhead being mounted whereby said column or columns make an acute angle with respect to the direction of said reciprocal motion, and said dot-forming elements are equally spaced in the direction perpendicular to said reciprocal motion whereby equally spaced rows of dots will be printed by said dot forming elements;
means for causing said printhead to move across said sheet with reciprocal motion; and
control means for coupling said converted electrical signals to said dot-forming elements whereby rows of dots corresponding to the image to be printed will be formed on said sheet at dot locations within an imaginary array of rows and columns of pel areas on said sheet, each pel area corresponding to the location of a picture element on the image to be printed, each pel area including at least two dot locations, none, or a predetermined number of dots being printed at the dot locations within each pel area, depending on the optical density of the corresponding picture element of the original image.

10. A facsimile receiver as recited in claim 9 wherein said predetermined number is less than the number of dot locations within the pel areas, and the particular dot locations within each pel area omitted are randomly selected.

11. A facsimile receiver as recited in claim 9 wherein said predetemined number equals the number of dot locations within said pel areas.

12. A facsimile receiver as recited in claim 9 wherein said electrical signals correspond to signals according to a CCITT group 3 fine mode transmission standard and there are exactly two dot locations within each pel area.

13. A facsimile receiver as recited in claim 9 wherein said electrical signals correspond to signals according to a CCITT group 3 standard mode transmission standard and there are exactly four dot locations within each pel area.

14. A method for printing an image from received facsimile signals which comprises:
receiving electrical signals representative of a facsimile image to be printed;
converting said electrical signals into signals for driving dot-forming elements of a printhead;
providing a paper surface on which said facsimile image is to be printed;
providing a printhead having a plurality of dot-forming elements arranged in one or more columns, said printhead being mounted for reciprocal motion across said paper surface whereby said dot-forming elements will form dots in equally spaced lines across said paper surface, the line density of said equally spaced lines being an even multiple of the line density of said facsimile image;
selectively coupling said converted electrical signals to said dot-forming elements whereby an image will be created on said paper surface within an imaginary array of rows and columns of pel areas, each of said pel areas corresponding to a picture element of said facsimile image, each of said dot-forming elements forming dots only in alternate pel areas.

15. A method for printing an image from received facsimile signals as recited in claim 14 wherein no two adjacent lines of dots includes a dot in the same column of pel areas.

16. A method for printing an image from received facsimile signals as recited in claim 14 where said multiple is four, and further including the step of dividing said dot-forming elements into groups of two, and causing the dots printed by each of the dot-forming elements in each group of two to be printed in the same columns.

17. A method for printing an image from received facsimile signals as recited in claim 16 wherein no two adjacent rows of dots includes a dot in the same column of pel areas.

18. A method for printing an image from received facsimile signals which comprises:

receiving electrical signals representative of a facsimile image to be printed;

converting said electrical signals into signals for driving dot-forming elements of a printhead;

providing a paper surface on which said facsimile image is to be printed;

providing a printhead having a plurality of dot-forming elements arranged in one or more columns, said printhead being mounted for reciprocal motion across said paper surface whereby said dot-forming elements will form dots at dot locations in equally spaced lines across said paper surface, the line density of said equally spaced lines being an even multiple of the line density of said facsimile image said multiple being greater than two; and selectively coupling said converted electrical signals to said dot-forming elements whereby an image will be created on said paper surface within an imaginary array of rows and columns of pel areas, each of said pel areas corresponding to a picture element of said facsimile image, and each row of said pel areas encompassing more than two lines of dot locations.

19. The method as recited in claim 18 wherein either none or a predetermined number of dots are printed within each pel area depending on the optical density of the corresponding picture element of the original image.

20. The method as recited in claim 19 wherein said predetermined number is less than the number of dot locations within the pel areas, and the particular dot locations within each pel area omitted are randomly selected.

21. A method for printing an image from received facsimile signals as recited in claim 18 wherein said received facsimile signals are signals according to a CCITT group 3 fine mode transmission standard, and each row of said pel areas includes exactly two lines of dots whereby each pel area includes two dot locations, both or neither of which are printed, depending on the optical density of the corresponding picture element of the original facsimile image.

22. A method for printing an image from received facsimile signals as recited in claim 18 wherein said received facsimile signals are signals according to a CCITT group 3 standard mode transmission standard, and each row of said pel areas includes exactly four lines of dots whereby each pel area includes four dot locations, none or a predetermined number of which are printed, depending on the optical density of the corresponding picture element of the original facsimile image.

23. The method as recited in claim 22 wherein said predetermined number is less than four, and the particular dot locations within each pel area omitted are randomly selected.

24. A method for printing an image from received facsimile signals as recited in claim 22 wherein said predetermined number equals four.

* * * * *